United States Patent [19]

Hagemeyer et al.

[11] Patent Number: 5,523,143
[45] Date of Patent: Jun. 4, 1996

[54] SHEET-LIKE POLYETHYLENE TEREPHTHALATE MATERIALS HAVING SLIGHT SURFACE ROUGHNESS, THEIR PREPARATION AND THEIR USE

[75] Inventors: Alfred Hagemeyer, Rheine; Hans-Peter Schildberg, Mannheim; Hartmut Hibst, Schriesheim; Dieter Baeuerle, Altenberg; Johannes Heitz, Freiburg, all of Germany

[73] Assignee: BASF Magnetics GmbH, Mannheim, Germany

[21] Appl. No.: 41,041

[22] Filed: Mar. 31, 1993

[30] Foreign Application Priority Data

Apr. 8, 1992 [DE] Germany .................. 42 11 712.7

[51] Int. Cl.⁶ .................. B32B 3/00; B32B 15/08
[52] U.S. Cl. .................. 428/141; 428/156; 428/161; 428/172; 428/192; 428/458; 428/694 TS; 428/900
[58] Field of Search .................. 428/156, 161, 428/141, 172, 192, 120, 409, 209, 461, 458, 910, 212, 332, 480, 694 TS, 689, 900

[56] References Cited

U.S. PATENT DOCUMENTS

| | | | |
|---|---|---|---|
| 3,871,947 | 3/1975 | Brekken | 428/156 |
| 4,417,948 | 11/1983 | Mayne-Banton et al. | 156/643 |
| 4,745,018 | 5/1988 | Chihara et al. | 428/141 |
| 4,868,006 | 9/1989 | Yorkgitis et al. | 427/53.1 |
| 4,933,123 | 6/1990 | Yoshida et al. | 264/22 |

FOREIGN PATENT DOCUMENTS

| | | |
|---|---|---|
| 153853 | 9/1984 | European Pat. Off. |
| 291459 | 11/1988 | European Pat. Off. |
| 346485 | 12/1989 | European Pat. Off. |
| 1313850 | 11/1992 | Japan |

OTHER PUBLICATIONS

Study of the A1/PET Interface in Pelation with Adhesion, Puydt et al. Surface and Interface Analysis, vol. 12, 486–490 (1988).

Adhesion, Microstructure and Composition of Thermally Evaporated . . . , Phuku et al. Thin Solid Films, 200 (1991) 263–274.

Structure Formation of UV–Laser Ablated . . . , Arenholz et al., Appl. Phys. A. 53 330–331 (1991).

Kunststoffe, vol. 79, No. 6, Jun. 1989, Holzer et al.

J. Of App. Phys., vol. 68, No. 4, Aug. 15, 1990, Srinivasan et al.

Primary Examiner—Donald J. Loney
Attorney, Agent, or Firm—Keil & Weinkauf

[57] ABSTRACT

Sheet-like polyethylene terephthalate materials having slight surface roughness consisting of dendritic, plateau-like structures having a fissured, fractal edge, a process for their preparation by exposing the surfaces to UV radiation produced by the decomposition of excimers, and the use of polyethylene terephthalate films treated in this manner as a substrate for ferromagnetic thin metal layers.

3 Claims, 2 Drawing Sheets

SHEET-LIKE POLYETHYLENE TEREPHTHALATE MATERIALS HAVING SLIGHT SURFACE ROUGHNESS, THEIR PREPARATION AND THEIR USE

BACKGROUND OF THE INVENTION

1. Field of the Invention

The present invention relates to sheet-like polyethylene terephthalate materials having slight surface roughness, a process for their preparation by exposure of the surfaces to UV radiation produced by the decomposition of excimers and the use of polyethylene terephthalate films treated in this manner as substrate material for ferromagnetic thin metal layers.

The embodiment of sheet-like polyethylene terephthalate material having a defined surface roughness is required for many uses of this material, The roughness generally results in an improvement in the adhesion, for example in adhesive bonds, and in the printability or the wettability. A toughened surface is also advantageous in the stacking of this material or in the winding of corresponding film webs. Polyethylene terephthalate (PET) films having a defined roughness are of considerable importance in particular for the production of magnetic recording media which consist of a polymeric substrate, a coherent, ferromagnetic thin metal layer applied to the surface of the substrate by a PVD (physical vapor deposition) method and, if required, a protective layer formed on the metal layer. The surface roughness of the films ensures little wear of the magnetic layer in the case of tribological stress due to the head. The roughening of the polymer surface also results in an improvement in the adhesion between the polymer and the magnetic layer. In addition, the mechanical and chemical stability of the metal layer set particular requirements for the procedure. However, these problem areas cannot be viewed in isolation, since any optimization of the mechanical properties of the magnetic recording media under discussion must never be achieved at the expense of the magnetic properties, i.e. of the properties relating to information storage.

A reduction in the wear of the magnetic layer due to the tribological stress of the head is achieved, inter alia, by virtue of the fact that direct contact between the head and the metal layer is avoided over its entire, macroscopic contact surface by means of the surface roughness. In order for this effect to be achieved, it is important for the average distance between the protuberances on the surface to be small compared with the dimensions of the macroscopic contact surface of the head. The height of the surface roughness is limited by the fact that, when the roughness has an excessively great height, the magnetic recording and playback properties of the applied layers are poor owing to the attenuation due to distance.

2. Description of the Related Art

Films in which a defined surface roughness is produced by incorporation or application of very small particles of an inert material are being used to date in order to obtain the desired properties of the polymer films for use as substrate material for magnetic thin-layer media (e.g. European Patent 0,153,853). Although these films are suitable, the production of such films requires particular and expensive production techniques.

The other conventional processes for the surface treatment of polymer surfaces in plasma, or by glow discharge, corona discharge, flaming, chemical etching or ion irradiation prior to metallization are never completely satisfactory. Essential aspects here were in particular the inadequate controllability of the energy effect and/or residual gas control and the resulting contamination by decomposition products.

The processes described to date and involving UV irradiation of polymer surfaces with continuous UV lamps, for example mercury vapor lamps, for improving the coatability, for improving the printability of polyolefins (U.S. Pat. No. 4,933,123) and for increasing the adhesive strength of adhesives on polyethylene terephthalate films (JP-A 313 850/1989), on the other hand, also results in only an insufficient increase in adhesion in the case of magnetic recording media having coherent metal layers. Owing to the long exposure time to continuous UV lamps, of the order of a few minutes, the process is very time-consuming and does not permit high processing speeds.

Furthermore, it is known that a periodic nub-like or cylindrical structure can be produced on the surface of oriented PET films by exposure to a UV excimer laser (E. Ahrenholz et al., Appl. Phys. A 53 (1991), 330). These structures occur in an energy range in which the laser radiation leads to removal of material (laser ablation). The structures have a typical distance of a few µm and are completely formed only after irradiation of the films with their plurality of pulses (at least 3 or 4). The spacing of the structure as well as the height of the structures increase with increasing energy and number of pulses. The height of these structures may be several µm. Both the height of these structures and the spacing of the structure are generally too large to permit the films treated in this manner to be used as substrates for magnetic thin-layer media.

SUMMARY OF THE INVENTION

It is an object of the present invention to provide sheet-like polyethylene terephthalate materials having a defined but very slight surface roughness and a process which does not have the stated disadvantages and by means of which such surface roughnesses can be produced in a simple manner and without removal of material and which ensure uniformity of the properties even over large areas at high processing speed.

We have found that this object is achieved by sheet-like polyethylene terephthalate materials if the surface roughness consists of dendritic, plateau-like structures having a fissured, fractal edge.

The present invention furthermore relates to a process for the preparation of these sheet-like polyethylene terephthalate materials having the surface roughnesses defined as stated above by exposure of the polyethylene terephthalate material to UV light produced by the decomposition of excimers, in a wavelength range of from 150 to 400 nm. In this procedure, it has proven advantageous to carry out the exposure of polyethylene terephthalate material under reduced pressure and at less than 100° C., preferably less than 60°. The process can also be effected in an atmosphere containing oxygen, nitrogen or argon, provided that the partial pressure is less than 200 mbar in the case of oxygen and nitrogen and less than 1 bar in the case of argon. Up to these partial pressures and at the state temperatures, it is therefore possible to obtain the dendritic, plateau-like structure even in the presence of oxygen, nitrogen or argon. Heating of the material carried out after the production of the dendrite structure has no effect on the resulting structure provided that the polyethylene terephthalate material itself remains stable, and there is no decline in the dendrite structure.

The PET materials defined according to the invention by the surface possessing fine roughness have a homogenous surface density of isolated and discrete projections having the characteristic dendritic structures. These structures possessing a fractal edge are from 2 to 50 nm, preferably from 2 to 30 nm, high and the ratio of circumference to height is greater than 500. The average distance between the branched structures is less than 10 µm, if necessary less than 1 µm, depending on the energy input for their production and on the duration of action. These structures defining the novel materials thus differ considerably, both in their appearance and in their size, from the conventional nub-like or cylindrical structures obtained either by surface treatment of the materials or by UV exposure of the surface by a prior art method.

The present invention has made it possible for PET materials to have the advantages of a roughened surface but not the disadvantages due to global and drastic roughening of the surface according to the prior art.

BRIEF DESCRIPTION OF THE DRAWING

Further advantages, details and features of the novel material and of the novel process are evident from the following description, certain embodiments and the Figures.

DESCRIPTION OF THE PREFERRED EMBODIMENTS

Figure 1:
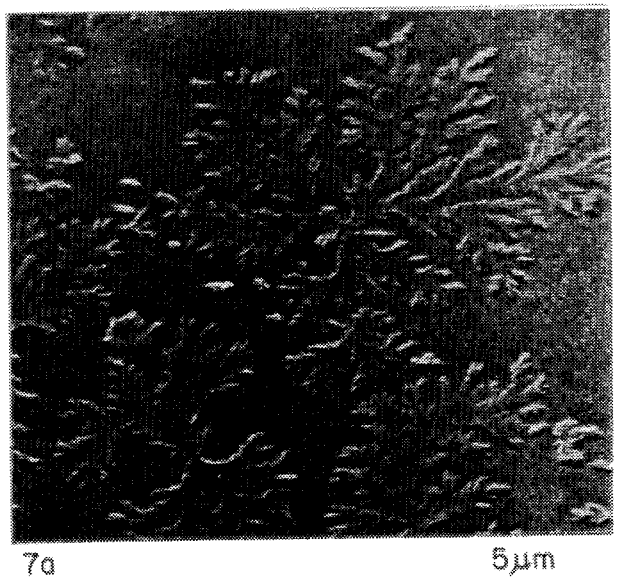
FIG. 1 shows a novel PET surface having the dendritic, plateau-like structures exhibiting a fissured edge.
Figure 2:
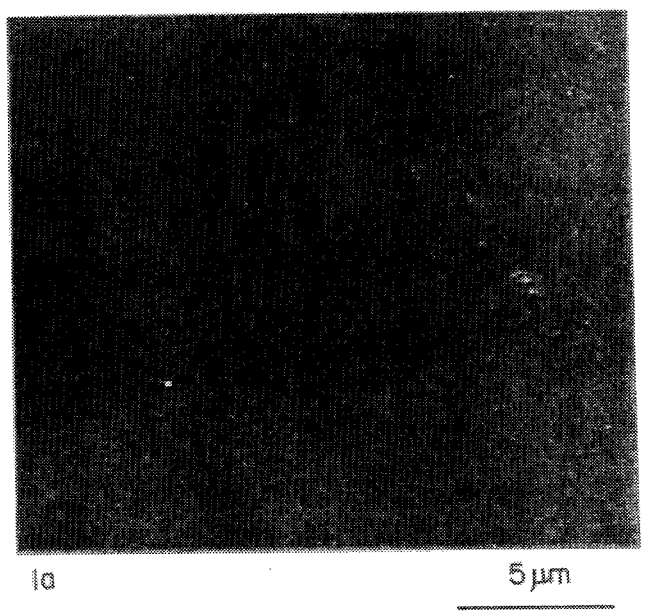
FIG. 2 shows the untreated PET surface and FIG. 3 shows a PET surface altered according to the prior art by exposure to UV light.
Figure 3:
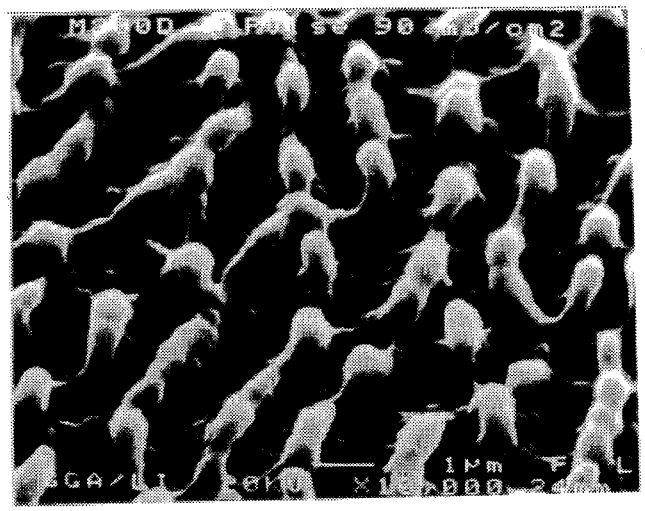

The surface shown in FIG. 1 is produced by exposing the PET film to an excimer laser of wavelength 248 nm with a pulse at an energy density of 39 mJ/cm$^2$ under greatly reduced pressure, while an identical PET film in the same apparatus, as is customary in the prior art, having many pulses at an energy density of 90 mJ/cm$^2$ leads to a surface having nubs, as shown in FIG. 3.

The radiation used for the novel process and based on the decomposition of excimers, for example of the excimer laser or of the incoherent excimer lamp, is known. The suitable wavelengths are from 150 to 400 nm, the KrF laser having a wavelength of 248 nm and the XeCl laser having a wavelength of 308 nm being particularly preferred. Depending on the chemical composition and on the incident wavelength, the surface of the PET material is exposed to 1–25, preferably 1–3, pulses/area at an energy density of from 1 to 1,000, preferably from 20 to 90, in particular, for example in the case of the KrF laser, from 30 to 70, mJ/cm$^2$. When they are used for the novel process, the repetition rate of the lasers is from 1 to 1,000 Hz and suitable pulse lengths are from 10 to 100 ns.

The PET materials defined according to the invention and the surfaces having fine roughness and obtained by the novel process are used in connection with the conditioning of PET films. They furthermore have a standard surface possessing uniform properties.

PET films of this type are very useful in particular as substrate material for the production of magnetic recording media which have a coherent ferromagnetic thin metal layer as the magnetic layer. These metal layers are applied to the substrate material with the aid of PVD methods, the form of the surface of the substrate material being a substantial, quality-determining factor for the adhesion of the layer to the substrate and for the wear of the layer under tribological stress due to the head.

Regarding the use of the novel PET materials, the production of these magnetic thin-layer media will be described by way of example. PET substrates used as film webs are exposed to an appropriate excimer laser by the novel process of UV exposure. The coherent ferromagnetic thin metal layer is then applied by a known procedure to a substrate pretreated in this manner. Suitable metal layers are in general cobalt-containing ones, for example Co-Ni-Cr, Co-Pt, Co-Ni-O and Co-Cr. Cobalt-chromium layers containing from 15 to 35 atom % of Cr, cobalt-nickel layers containing more than 10 atom % of nickel or cobalt-nickel-oxygen layers containing more than 10 atom % of nickel and from 3 to 45 atom % of oxygen are preferred. However, corresponding thin metal layers based on iron are also known and used. These layers are produced with the aid of a PVD method, for example by vaporization, electron beam vaporization, sputtering, ion plating or application of layers for metal components by the arc method. Vapor deposition and sputtering are preferred. The ferromagnetic metal layers produced in this manner are from 20 to 500 nm thick. In the case of lower layers, layer thicknesses of from 2 to 300 nm are preferred. The thickness of protective layers for improving the abrasion resistance and corrosion resistance is from 1 to 100 nm. The application of the carbon layer, the surface oxidation of the metal layer, coating with liquid oligomers generally based on fluorine-containing polyethers, the formation of oxides, nitrides or carbides of silicon, of zirconium, of hafnium and of titanium or combinations of these measures are known here.

The magnetic recording media obtained using the novel PET materials or the novel process exhibit high adhesion of the metal layer to the polymer film and a reduction in friction as well as an improvement in the still picture behavior. This is illustrated by the Examples which follows.

In general, in the novel process for the production of the specific surface having fine roughness on the PET material, the roughening by the UV exposure is carried out in a single process step, and only the surface of the film is altered while the remainder of the film is not damaged. Treatment of the structured PET material, in particular after heating, with, for example, alcohols or acetone has no effect on the surface structure. On the other hand, the dendrite structures can be removed by means of chloroform with the formation of a grainy surface, the surface of the PET material exhibiting indentations whose shape corresponds to the appearance of the dendrites. Owing to the use of smaller amounts of energy and an excimer laser having a small number of pulses, it is possible to expose large areas uniformly with a higher throughput.

Where the novel process is used for the production of magnetic thin-layer media, it is also advantageous that the production of the surface roughness of the PET films can be carried out directly before a further processing step, for example the application of a ferromagnetic thin metal layer, in one and the same process chamber. Such an in situ pretreatment ensures that aging or soiling of the roughened surface does not occur and, since the radiation source is mounted outside the process chamber, easy controllability and monitoring of the substrate pretreatment process are ensured.

EXAMPLE 1

Improvement of the Adhesion

In a commercial vapor deposition unit, 200 nm thick $Co_{80}Ni_{20}$ layers are applied under greatly reduced pressure to 50 μm thick PET films (Mylar film from DuPont) using an electron beam evaporator. The PET films were either subjected to no pretreatment prior to vapor deposition or were exposed, in the vapor deposition unit, through a quartz window, to an excimer laser at a wavelength of 248 nm with energy densities of from 30 to 50 mJ/cm$^2$ and from 1 to 3 pulses.

For each of the samples obtained, the peel force was determined in a peel test (inverse 180° EAA peel test; Y. De Puydt, P. Bertrand, P. Lutgen, Surf. Interface Anal. 12 (1988), 486; P. Phuku, P. Bertrand, Y. De Puydt, Thin Solid Films, 200 (1991), 263). It was found that an unexposed sample had an adhesion of 0.9N/cm whereas the exposed samples had a peel force of at least 3.5N/cm.

EXAMPLE 2

Reduction of Friction Superquasistatic friction (SQF)

Figure 4:
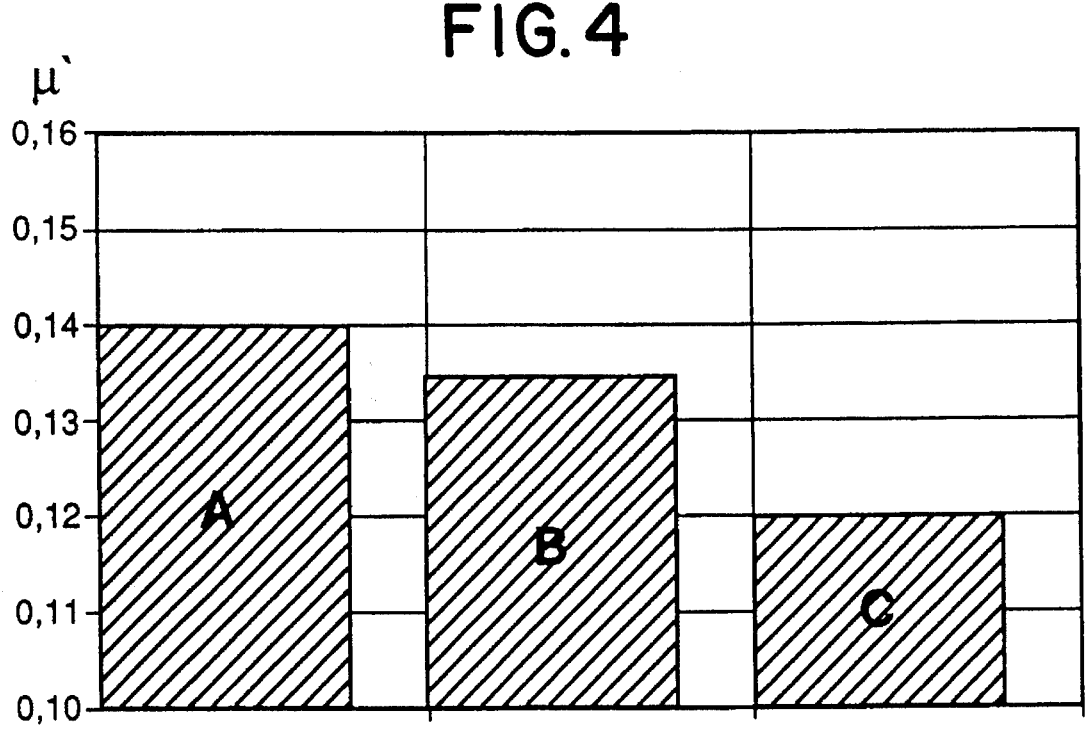
FIG. 4 is a chart showing the superquasistatic friction of an untreated film and two film treated in accordance with the invention.
Figure 5:
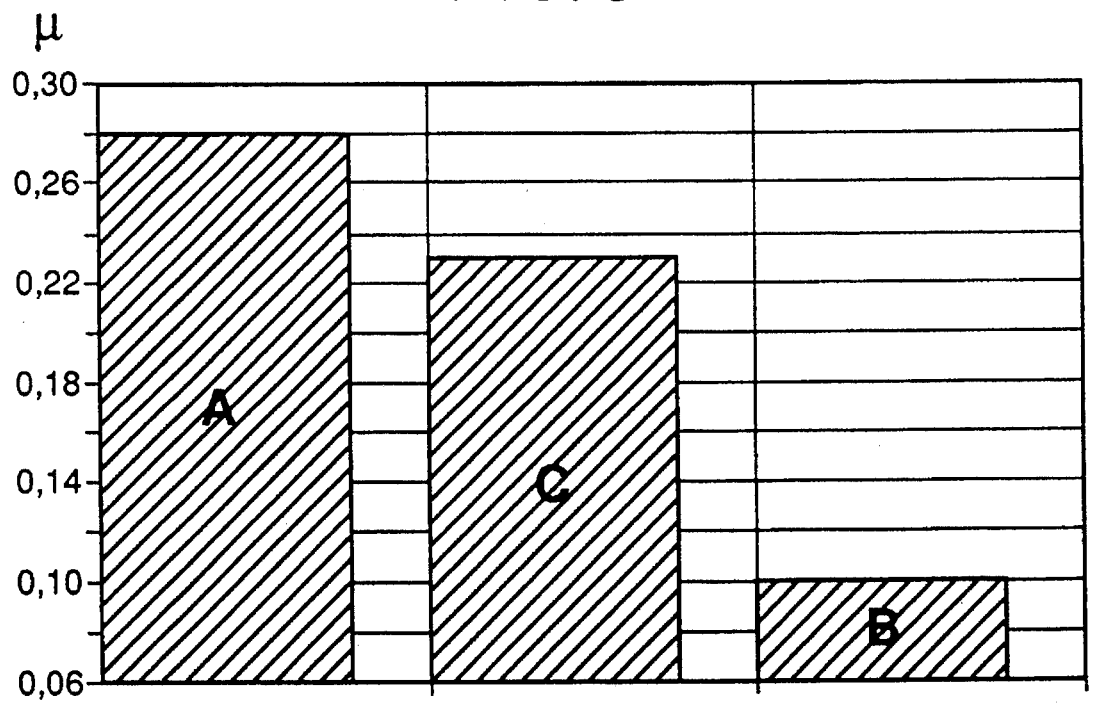
FIG. 5 is a chart showing the coefficient of sliding friction µ of an untreated film and two films treated in accordance with the invention.

200 nm thick $(Co_{80}Ni_{20})_{80}O_{20}$ layers were applied by vapor deposition to Mylar PET films (50 μm) which had been pretreated in situ beforehand in a vacuum chamber by UV exposure under reduced pressure to a KrF excimer laser (248 nm) with from 1 to 3 pulses at energy densities of from 29 to 40 mJ/cm$^2$. In the measurement of the SQF coefficient (after a grinding-in phase in which the test specimen was drawn over 50 mm of the layer at 550 μm/sec, followed by the actual measuring phase in which the test specimen was moved over the following 5 mm of the layer only at the very low advance speed of 13 μm/sec), the fluence showed a clear trend, i.e. the SQF coefficient μ' decreased with increasing fluence. FIG. 4 shows the results of the measurements for the untreated film A in comparison with the films B and C exposed to 28.9 mJ/cm$^2$ and 39.3 mJ/cm$^2$, respectively.
Sliding friction The conventional coefficient μ of sliding friction was measured for the same abovementioned layers (WC sphere, diameter d=6 mm, advance speed 1 cm/min). In all cases, a significant reduction in the coefficient of sliding friction is found in comparison with the unexposed parts of the same sample (FIG. 5).

EXAMPLE 3

Improvement of the Wear Behavior

To evaluate the effect of UV pretreatments on the tribological properties, still picture measurements were carried out for Co-Ni-O layers on pretreated Mylar films. First a signal (10 kfci) was recorded on the medium and then the decrease in output level with time was monitored on a drum tester in which the fixed head was in contact with the clamped circular medium rotating beneath it. A read signal decreasing monotonically with time was recorded until the magnetic layer had been rubbed away completely down to the film and a read signal was no longer detectable. Mylar 200D PET films (inner surface) were pretreated at 248 nm by means of an excimer laser and then coated with a 200 nm Co-Ni-O layer by vapor deposition. The laser fluences chosen were 30, 40 and 59 mJ/cm$^2$, and exposure was carried out in each case from 1 to 3 pulses. The Co-Ni-O layers had the following structure: first a 180 nm thick layer containing about 15% of oxygen and then a 20 nm thick layer containing about 40% of oxygen. The layers were lubricated with Fomblin Z-DOL and were subjected to the still picture test. Compared with unexposed reference samples, the lives in stop motion were longer and the drop in output level considerably smaller. Considerably more revolutions are possible on exposed surfaces than on the unexposed surfaces of the same sample until the layer has been completely rubbed through.

While lives in stop motion of only a few minutes or less were often observed until complete disappearance of the output, lives in stop motion of several hours could be achieved on exposed surfaces. The read signal on the exposed surfaces was greater than on the non-pretreated surfaces in all cases. Optical micrographs showed flaking of the magnetic layer on unexposed surfaces along the head track. Extensive delamination of the layer frequently occurred, particularly at the edge of the track, where particularly high shear forces act and the layers are subjected to high stresses. This destruction made the medium completely useless, and the output level dropped abruptly to zero. On exposed surfaces, abrasion was substantially less and no signs of mechanical damage or destruction of the layer along the head track were found under the optical microscope.

Owing to the improved adhesion of the layer, the medium withstood far greater shear forces at the interface, and the lower friction reduced the stress field and led to less force being applied during the tribiological stress due to the head.

This shows that the fine roughness in the form of dendritic structures, produced on the surface of PET by UV exposure, leads to improved still picture behavior, whereas the untreated smooth films tend to stick owing to the large contact area with the head, with the result that the layer is rapidly destroyed and they therefore have completely inadequate wear properties.

We claim:

1. A sheet of polyethylene terephthalate material having slight surface roughness, wherein the surface roughness consists of dendritic, plateau structures having a fissured, fractal edge, the structures having a height of from 2 to 50 nm and a ratio of circumference to height of more than 500.

2. A sheet of polyethylene terephthalate material as claimed in claim 1, wherein the average distance between the dendritic, plateau structures is not more than 10 μm.

3. A structure comprising a polymeric substrate of polyethylene terephthalate and a coherent, ferromagnetic thin metal layer applied to the substrate by means of a PVD method, wherein the substrate is a sheet of polyethylene terephthalate as set forth in claim 1.

* * * * *